United States Patent
Rae

[11] Patent Number: 5,805,398
[45] Date of Patent: Sep. 8, 1998

[54] ARC FAULT DETECTOR WITH IMMUNITY TO TUNGSTEN BULB BURNOUT AND CIRCUIT BREAKER INCORPORATING SAME

[75] Inventor: Thomas Christopher Rae, Irwin, Pa.

[73] Assignee: Eaton Corporation, Cleveland, Ohio

[21] Appl. No.: 939,976

[22] Filed: Sep. 29, 1997

[51] Int. Cl.⁶ .................................................. H02H 3/00
[52] U.S. Cl. .............................................. 361/42; 361/94
[58] Field of Search ................................. 361/42, 49–50, 361/79, 86–87, 93–94, 102, 111, 45; 335/201; 324/76.41, 76.44, 76.45, 520, 522; 364/483, 484, 486

[56] References Cited

U.S. PATENT DOCUMENTS

| | | | |
|---|---|---|---|
| 3,996,499 | 12/1976 | Gary et al. | 317/36 TD |
| 5,224,006 | 6/1993 | MacKenzie et al. | 361/45 |
| 5,307,230 | 4/1994 | MacKenzie | 361/96 |
| 5,459,630 | 10/1995 | MacKenzie et al. | 361/45 |
| 5,519,561 | 5/1996 | Mrenna et al. | 361/105 |
| 5,691,869 | 11/1997 | Engel et al. | 361/42 |

*Primary Examiner*—Jeffrey A. Gaffin
*Assistant Examiner*—Michael J. Sherry
*Attorney, Agent, or Firm*—Martin J. Moran

[57] ABSTRACT

A circuit breaker with an arc fault circuit provides immunity to false trips caused by tungsten bulb burnout and by a cold tungsten filament energized through a solid state dimmer. The detector circuit includes a pulse generator which generates pulses in response to the step increases in current occurring each time an arc is struck. A zener diode limits the amplitude of pulses generated by the pulse generator to a value which is below that of pulses generated by the tungsten lamp. When a time attenuated accumulation of these pulses reaches a predetermined value, the circuit breaker is tripped. By clipping the pulses with the zener diode, the few large pulses generated by tungsten bulb burnout or energization of a cold tungsten bulb by a solid state dimmer switch are insufficient to allow the time attenuated accumulation of pulses to reach the trip value.

7 Claims, 3 Drawing Sheets

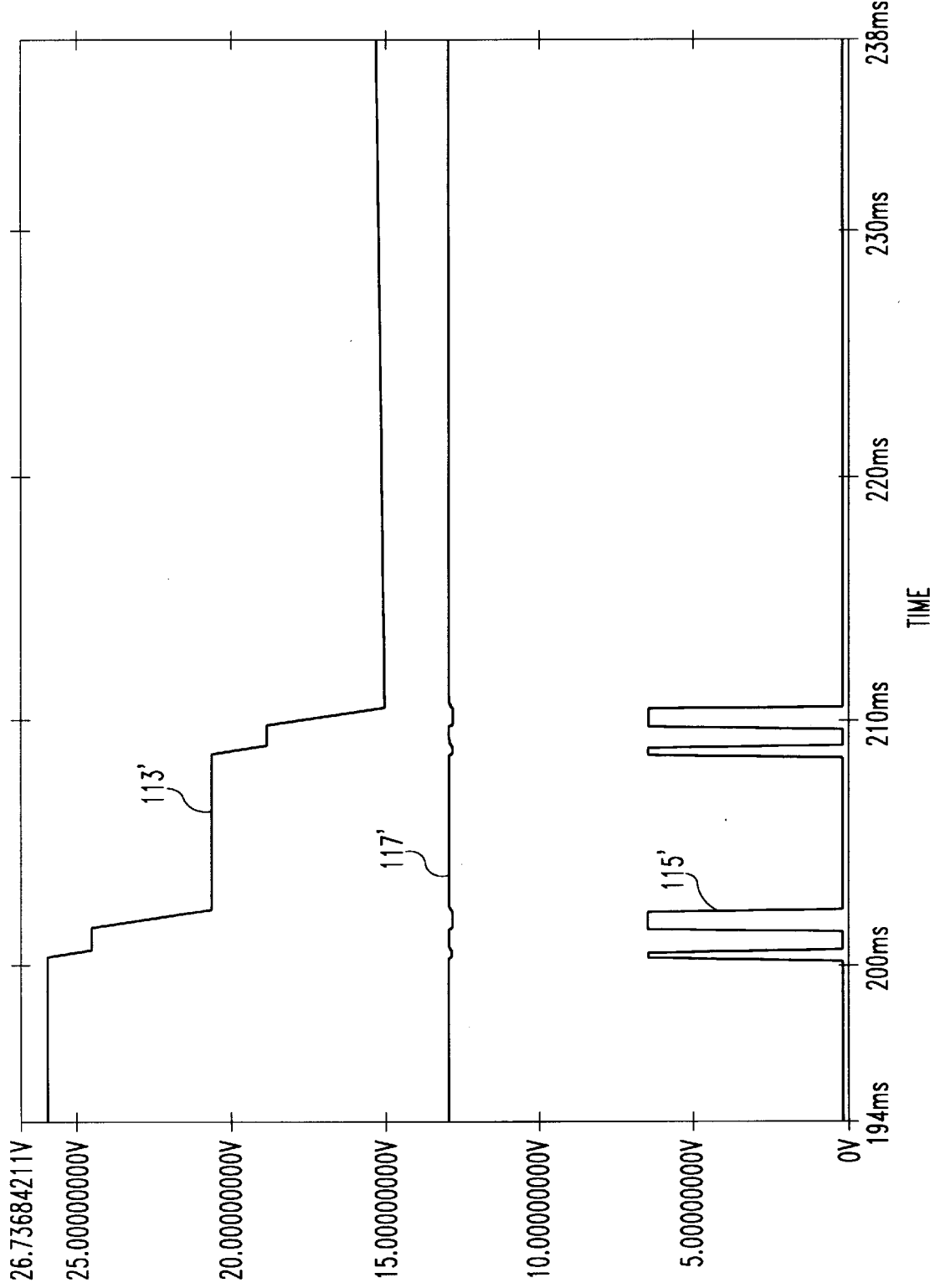

ARC FAULT DETECTOR WITH IMMUNITY TO TUNGSTEN BULB BURNOUT AND CIRCUIT BREAKER INCORPORATING SAME

BACKGROUND OF THE INVENTION

1. Field of the Invention

This invention relates to detection and interruption of currents in circuits experiencing arc faults. More particularly, it relates to apparatus which minimizes the effects of other phenomena such as the burnout of tungsten bulbs, which can falsely provide an indication of an arc fault.

2. Background Information

Arc faults can occur in electrical systems for instance between adjacent bared conductors, between exposed ends of broken conductors, at a faulty connection, and in other situations where conducting elements are in close proximity. Arc faults in ac systems can be intermittent as the magnetic repulsion forces generated by the arc current force the conductors apart to extinguish the arc. Mechanical forces then bring the conductors together again so that another arc is struck.

Arc faults typically have high resistance so that the arc current is below the instantaneous or magnetic trip thresholds of conventional circuit breakers. Also, the intermittent nature of an arc fault can create an average RMS current value which is below the thermal threshold for such circuit breakers. Even so, the arcs can cause damage or start a fire if they occur near combustible material. It is not practical to simply lower the pickup currents on conventional circuit breakers as there are many typical loads which draw similar currents, and would therefore, cause nuisance trips.

Much attention has been directed toward trying to distinguish arc currents from other intermittent currents. It has been recognized that arc currents generate a step increase in current when the arc is struck. However, many typical loads generate a similar step increase, such as for instance when the device is turned on. In many instances, the step increases generated by these loads are singular events while an arc fault generates a series of step increases. The arc fault detector described in U.S. Pat. No. 5,224,006 counts the step increases in current and generates a trip signal if a selected number of step increases occur within a given interval. However, there are loads, such as a solid state dimmer switch with the firing angle phased back substantially, which also generate repetitive step increases in current. This problem is addressed by the arc fault detector in U.S. Pat. No. 5,691,869, in which the arc current is passed through a bandwidth limited filter which generates pulses having an amplitude proportional to the step increases. An arc indication is generated when a time attenuated accumulation of these pulses reaches a predetermined value. Thus, a few very large magnitude step increases within a period of time, or a larger number of more modest step increases within a similar time period, generate a trip signal. The trip level can be set so that the cyclic pulses generated by a dimmer do not generate the time attenuated accumulation which reaches the trip level.

There is at least one arc condition which can occur in a protected circuit to which it is desired that the arc fault circuit not respond. This is an arc created by the burnout of a tungsten filament such as in a light bulb. When the filament burns through, a small gap is created between the burned out ends of the filament. An arc is struck across this gap and can quickly envelop the entire filament so that it extends between the two conductors thereby drawing a very large arc current. In order to terminate this arc, tungsten bulbs are provided with a small fuse in the base. Even so, burnout of the filament and blowing of the fuse results typically in a pair of current pulses of opposite polarity. This pair of pulses can be of sufficient magnitude that the threshold value of the time attenuated accumulation of pulses in the circuit breaker described in U.S. Pat. No. 5,691,869 is exceeded and the circuit breaker is tripped. This is considered a nuisance trip as the fuse has interrupted the arc.

Tungsten filament bulbs can also generate false trips when used with a dimmer. As mentioned, a dimmer which is phased back can generate repetitive step increases in current on each half cycle. As also discussed, the circuit breaker can be set so that the threshold of the time attenuated accumulation of pulses generated by the dimmer do not reach the trip level with normal loads. However, when a tungsten filament lamp is first turned on, the cold filament has a very low resistance and can draw up to fifteen times normal current. This can result in a nuisance trip when a tungsten lamp controlled by a dimmer switch is first turned on.

There is a need for an improved arc fault detector and circuit breaker incorporating such a detector which reliably responds to arc faults while ignoring tungsten lamp burnout and false response to turn-on of tungsten bulbs controlled by a dimmer switch.

SUMMARY OF THE INVENTION

These needs and others are satisfied by the invention which is directed to an arc fault detector and a circuit breaker incorporating such a detector in which a zener diode places limits on pulses having an amplitude proportional to the magnitude of step increases in current in the protected circuit so that the time attenuated accumulation of these pulses does not reach the trip level based upon a few very large pulses which can be generated by burnout of a tungsten lamp or turn-on of a tungsten lamp controlled by a dimmer switch. In particular, the zener diode clips the pulses generated in response to the step increases in current in the protected circuit before the time attenuated accumulation of the pulses. As a true arc fault will continue to strike at a random rate and therefore raise the time attenuated accumulation of pulses to the trip threshold, false trips due to burnout of a tungsten lamp or turn-on of a cold tungsten bulb are avoided.

More particularly, the invention is directed to an arc fault circuit breaker which interrupts current in an electrical system subject to arc faults generating step increases in current each time an arc is struck and which also services tungsten filament lamps. The circuit breaker includes separable contacts and trip means for opening the contacts. The trip means includes pulse generating means generating a pulse signal containing pulses related in amplitude to the step increases in current each time an arc is struck and also containing pulses related in amplitude to any burnout of the tungsten lamp or any turn-on of a tungsten lamp controlled by a dimmer switch. In addition, the trip means includes a zener diode limiting the amplitude of the pulses in the pulse signal to a selected amplitude which is less than the amplitude of the pulses related in amplitude to the tungsten bulb burnout or turn-on current pulses to generate conditioned pulses. The trip means further includes means generating an output signal when a time attenuated accumulation of the conditioned pulses reaches a predetermined value. The zener diode has a breakover voltage selected to limit the amplitude of the voltage pulses to the selected amplitude. Preferably, the pulse generating means includes means generating the pulse signal with pulses of a single polarity and the means generating the trip signal comprises a capacitor, means applying the conditioned pulses to the capacitor, adjusting means connected to the capacitor for adjusting charge on the capacitor at a selected rate in an opposite sense from the charge applied by the conditioned pulses, and output means opening the separable contacts when the voltage on the capacitor reaches a predetermined valve representing the selected time attenuated accumulation of the pulses.

BRIEF DESCRIPTION OF THE DRAWINGS

A full understanding of the invention can be gained from the following description of the preferred embodiments when read in conjunction with the accompanying drawings in which:

FIG. 3 is a wave form diagram of the arc fault detector of FIG. 1 illustrating the effect of the invention.

DESCRIPTION OF THE PREFERRED EMBODIMENTS

Figure 1:
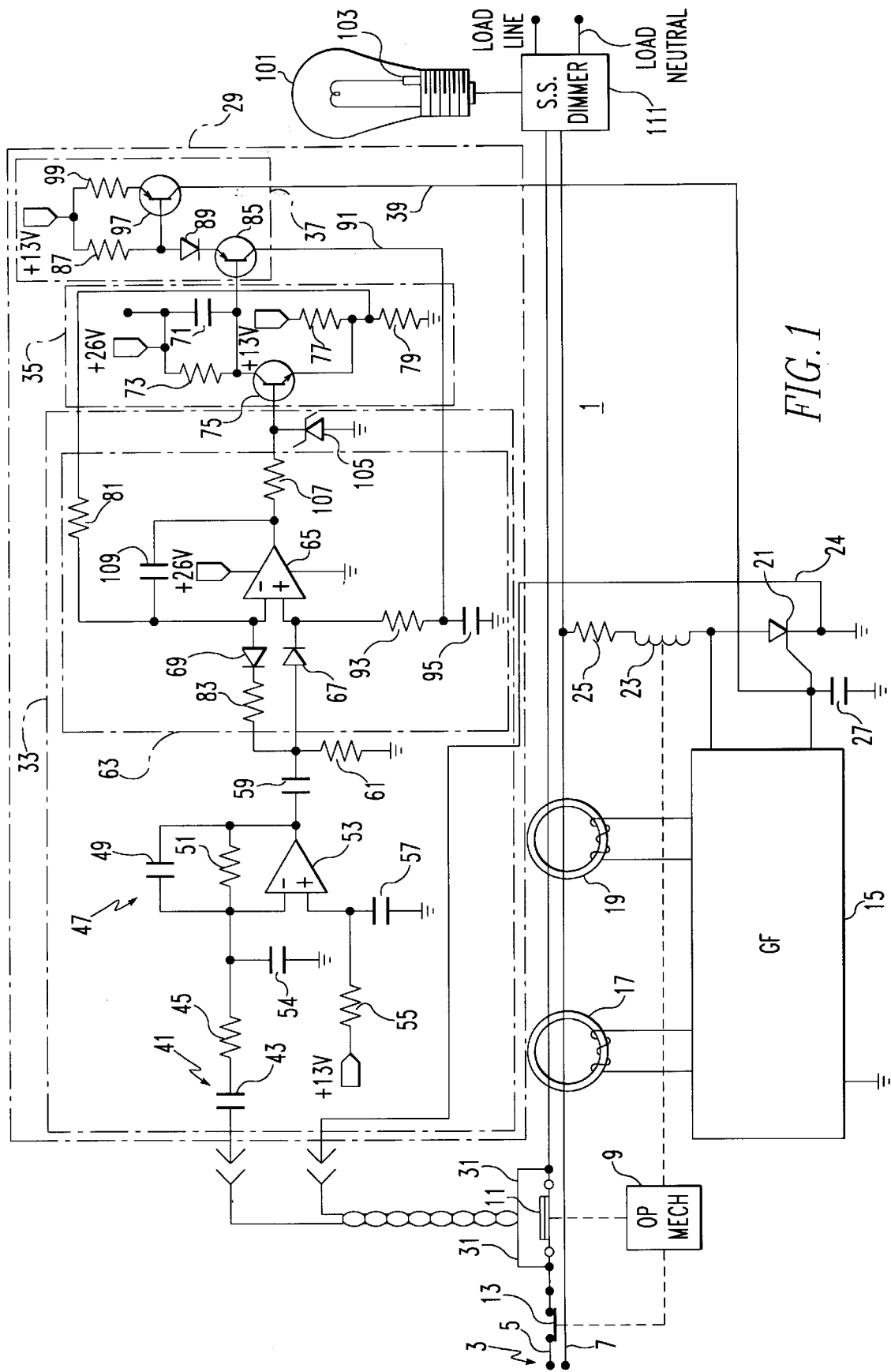
FIG. 1 is a schematic diagram of an arc fault circuit breaker incorporating the invention.

FIG. 1 illustrates an arc fault circuit breaker 1 in accordance with the invention providing protection for an electrical circuit 3 which includes a line conductor 5 and a neutral conductor 7. The circuit breaker 1 provides overcurrent and short circuit protection, arc fault protection and ground fault protection for the electrical system 3. Over current and short circuit protection is provided by the conventional thermal-magnetic trip mechanism (not shown) which includes a bimetal 11. As is well known, the bimetal responds to persistent overcurrent conditions to actuate a spring-powered operating mechanism 9 to open a set of separable contacts 13 connected in series with the line conductor 5 to interrupt current flow in the electrical system.

Ground fault protection is provided by a ground fault circuit 15. Such circuits are well known in the art. The ground fault circuit 15 shown is the well known dormant oscillator type which utilizes two sensing coils 17 and 19 which sense current in the line and neutral conductors 5 and 7. In response to a line to ground or a neutral to ground fault, the ground fault circuit 15 generates a ground fault trip signal which turns on the silicon controlled rectifier (SCR) 21 which energizes a trip solenoid 23 connected by the SCR 21 between the neutral conductor 7 and circuit breaker common which is referenced to the line conductor through the lead 24. A resistor 25 limits the current through the coil 23 and a capacitor 27 protects the gate of the SCR 21 from being falsely tripped on noise. Energization of the shunt trip coil 23 actuates the spring-powered operating mechanism 9 to open the separable contacts 13. Current is drawn through the coil 23 to provide power to the ground fault circuit 15 through the lead 26. However, this current is insufficient to actuate to the trip coil.

Arc fault protection is provided by an arc fault circuit 29. This arc fault circuit 29 utilizes a pair of leads 31 connected across the bimetal 11 to sense current in the protected electrical system 3. As taught by U.S. Pat. No. 5,519,561, as the resistance of the bimetal 11 is known, the voltage drop across this bimetal provides a measure of the current flowing in the line conductor 5. The arc fault circuit 29 also includes a pulse generator 33, a circuit 35 which provides a time attenuated accumulation of the pulses generated by the pulse generator 33, and an output circuit 37 which provides a trip signal which through the lead 39 turns on the SCR at 21 to open the separable contacts 13 in the same manner as the ground fault circuit 15.

The pulse generator 3 includes a high pass filter 41 formed by the series connected capacitor 43 and resistor 45, followed by a low pass filter 47 formed by the parallel connected capacitor 49 and resistor 51. The high pass filter 41 and low pass filter 47 have a band pass in a range which generates pulses in response to the step increases in current caused by striking of an arc and yet is below any carrier frequencies that may be on the power line. In the exemplary circuit, this pass band is in a range of about 290 to 1,540 Hz for the 3 db points and could go up to 10 KHz or more.

An operational amplifier (op amp) 53 provides gain for the pulses. A capacitor 54 reduces high frequency noise in the pulses. The op amp 53 is biased at its non-inverting input by a 13 vdc supply voltage. A resistor 55 and capacitor 57 delay application of the bias to prevent false trip signals during power up. The positive and negative pulses generated by the band pass filter ride on the plus 13 vdc volt bias applied to the op amp 53. This bias is removed by the ac coupling capacitor 59 which along with the resistor 61 forms another high pass filter stage. The bi-polar pulse signal resulting is rectified by a rectifier circuit 63 which includes another op amp 65. Positive pulses are applied to the non-inverting input of the op amp 65 through the diode 67 while negative pulses are applied to the inverting input through the diode 69. The output of the op amp 65 is a pulse signal having pulses of a single polarity.

The circuit 35 generates a time attenuated accumulation of the pulses in the pulse signal generated by the pulse generator 33. The pulses are accumulated on a capacitor 71 connected to the 26 vdc supply. A bleed resistor 73 connected across the capacitor provides the time attenuation. The pulses are applied to the capacitor 71 through a transistor 75. When no pulses are generated, both electrodes of the capacitor 71 are at 26 volts. The pulses from the pulse generator 33 provide base drive current for the transistor 75. A voltage divider formed by the resistor 77 and 79 connected at their midpoint to the emitter of the transistor 75 set the minimum amplitude for the pulses to turn on the transistor 75. This threshold is selected so that pulses which could be generated by some normal loads, such as for instance a dimmer switch operating at normal loads, are not accumulated. The amplitude of the pulses is set by the gain of the op amp 65 which in turn is determined by the ratio of the feed back resistor 81 and input resistor 83. The amplitude and duration of each pulse determine the amount of charge which is applied to the capacitor 71. The successive pulses are accumulated through the summation of the charge they add to the capacitor 71. The resistor 73 continuously bleeds the charge on the capacitor 71 with a time constant determined by the values of the capacitor 71 and resistor 73 to time attenuate the accumulation of the pulses. It can be appreciated that the magnitude and time interval between pulses determines the instantaneous voltage that appears across the capacitor 71.

The output circuit 37 monitors the voltage across the capacitor 71 representing the time attenuated accumulation of the pulses in the pulse signal generated by the pulse generator. Each pulse lowers the voltage on the capacitor which is applied to the base of a transistor 85 in the output circuit. A voltage is applied to the emitter of the transistor 85 by the 13 vdc supply through a resistor 87 and diode 89. With no pulses being generated, the voltage on the base of the transistor 85 is 26 volts. Without the diode 89, the 13 volt reverse bias would destroy the base to emitter junction of the transistor 85. The diode 89 withstands this voltage. When the voltage at the lower end of the capacitor 71, and therefore on the base of the transistor 85, falls below the 13 volts minus the forward drop across the diode 89, the transistor 85 is turned on. Feedback provided through the lead 91 and the resistors 93 and 95 holds the transistor 85 on by providing a continuous output of the op amp 65 which holds the transistor 75 on. Turn on of the transistor 85 provides base drive current for the transistor 97 which draws current limited by the resistor 99 to generate an arc fault trip signal which turns on the SCR 21 and trips the separable contacts 13 open.

The larger the pulses in the pulse signal generated by the pulse generator 33 the harder the transistor 75 is turned on, and hence, the faster charge is accumulated on the capacitor 71. As mentioned, burnout of a tungsten bulb 101 energized by the electrical system 3 protected by the circuit breaker 1 can generate, typically, two large amplitude pulses which can by themselves accumulate sufficient charge on the capacitor 71 to reduce the voltage on the base of the transistor 85 to the threshold voltage which generates the trip signal. In order to discriminate against tungsten bulb burnout since such a condition is addressed by a fuse 103 in the bulb 101, the amplitude of the pulses and the pulse signal generated by the pulse generator 33 are limited. This limiting of pulse amplitude is accomplished by the zener diode 105 which is connected between the base of transistor 75 and ground. The zener voltage, of course, is selected to be above the threshold voltage determined by the resistors 77 and 79. A resistor 107 limits the current drawn by the zener diode after breakover. The zener diode 105 has some capacitance which can cause instability. The current drawn by the zener diode 105 out of the feedback loop further contributes to the instability. The feedback capacitor 109 provides compensation which overcomes this instability. The valves of the components also avoid false trips due to turn-on of a tungsten bulb controlled by a solid state dimmer switch 111 which is phased back. In this case, the high amplitude initial pulses are clipped by the zener diode 105 and do not lower the voltage across capacitor 71 to the trip valve before the following pulses fall below the threshold valve set by the resistors 77 and 79.

Figure 2:
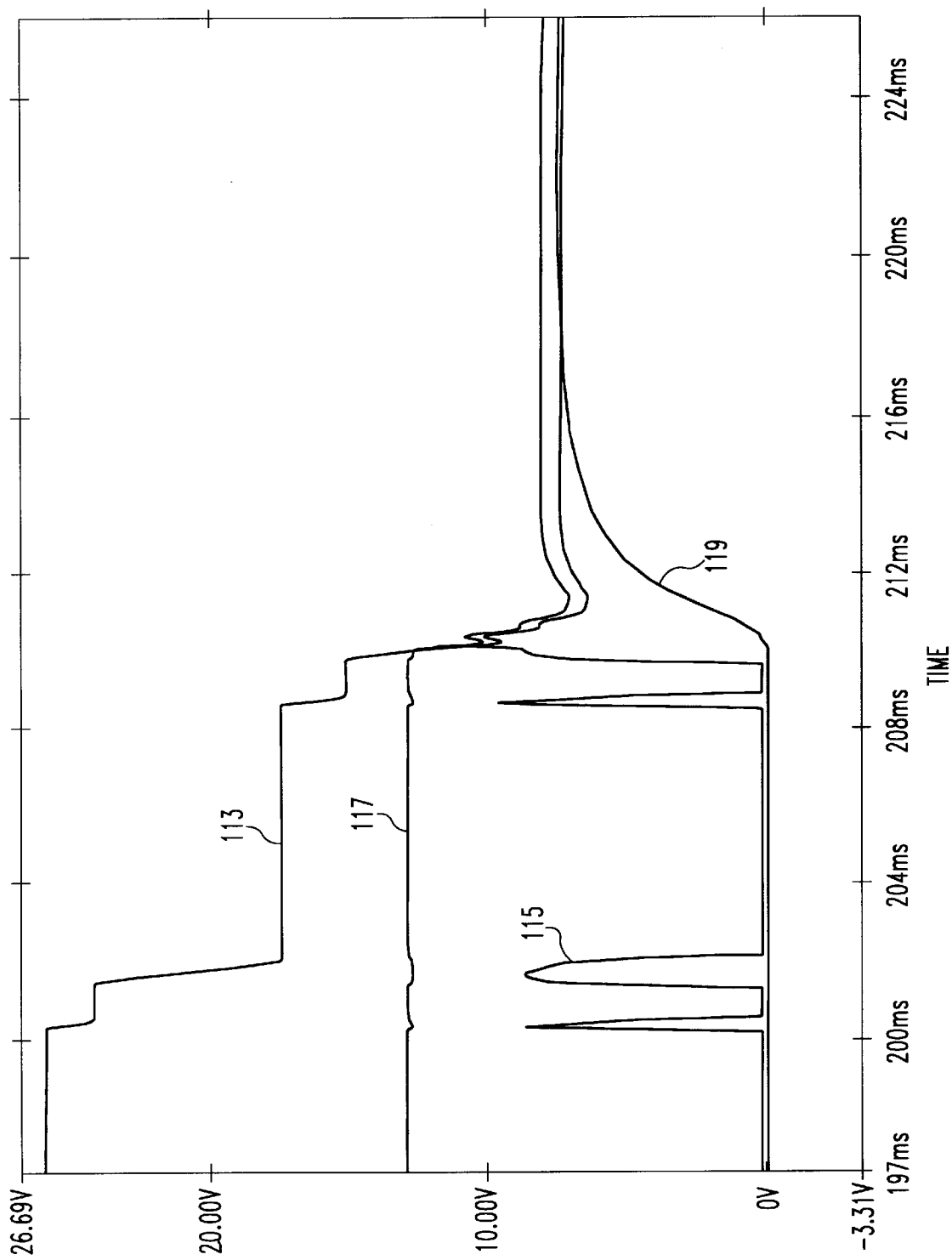
FIG. 2 is a wave form diagram of an arc fault detector without the invention.

FIG. 2 illustrates operation of the arc fault detector 29 without the limiting of pulse amplitude provided by the zener diode 105. The trace 113 illustrates the voltage on the base of the transistor 85 in the output circuit 37 which is also the voltage on the lower end of the capacitor 71 and represents the time attenuated accumulation of pulses. The trace 115 represents the pulse signal generated by the pulse generator 33 in response burnout of a tungsten filament. As can be seen, large amplitude pulses are generated by the pulse generator on two successive half cycles of line current. These pulses are sufficient to bring the voltage on the base of transistor 85 down to the voltage on the emitter for the transistor as represented by the trace 117. The resultant turn-on of the transistor 85 and subsequent turn-on of the transistor 97 generate the trip signal represented by the trace 119 which turns on the SCR 121 and trips the separable contacts 13 open.

FIG. 3 is similar to FIG. 2 expect that the presence of the zener diode 105 results in clipping of the pulses generated by the pulse generator 33 and represented by the trace 115'. It can be seen that these clipped pulses do not bring the voltage on the base of the transistor 85 represented by the trace 113' to below the voltage on the emitter represented by the trace 117' so that no trip signal is generated.

While specific embodiments of the invention have been described in detail, it will be appreciated by those skilled in the art that various modifications and alternatives to those details could be developed in light of the overall teachings of the disclosure. Accordingly, the particular arrangement disclosed are meant to be illustrative only and not limiting as to the scope of invention which is to be given the full breath of the claims appended and any and all equivalents thereof.

What is claimed is:

1. A circuit breaker for interrupting current in an electrical system subject to arc faults generating step increases in current each time an arc is struck and subject to other current pulses of at least a certain high amplitude, said circuit breaker comprising:

separable contacts which interrupt said current in said electrical system when open; and trip means comprising pulse generating means generating a pulse a signal containing pulses related in amplitude to said step increases in current each time an arc is struck and containing pulses related in amplitude to said other current pulses, zener diode means limiting amplitude of said pulses in said pulse signal to a selected amplitude which is less than said certain high amplitude of said other current pulses to produce conditioned pulses, means generating a trip signal as a function of a time attenuated accumulation of said conditioned pulses, and means responsive to said trip signal to open said separable contacts.

2. The circuit breaker of claim 1 wherein said pulse generating means includes means generating said pulse signal with pulses of a single polarity, said zener diode means comprises a single zener diode polarized to limit said amplitude of said pulses of said single polarity, and said means generating said trip signal comprises a capacitor, means applying said conditioned pulses to said capacitor to apply charge to said capacitor, adjusting means connected to said capacitor for adjusting charge on said capacitor at a selected rate in an opposite sense from said charge applied by said conditioned pulses, and output means generating said trip signal when voltage on said capacitor reaches a predetermined value, said capacitor and adjusting means being selected such that said voltage on said capacitor represents said time attenuated accumulation.

3. A circuit breaker for interrupting current in an electrical system subject to arc faults generating step increases in current each time an arc is struck and subject to current pulses generated by a tungsten bulb in said electrical system, said circuit breaker comprising:

separable contacts which interrupt said current in said electrical system when open; and trip means comprising pulse generating means generating a pulse signal containing pulses of a single polarity related in amplitude to said step increases in current each time an arc is struck and containing pulses of said same single polarity related in amplitude to current pulses generated by said tungsten bulb, a zener diode limiting amplitude of said pulses in said pulse signal to a selected amplitude which is less than the amplitude of said pulses related in amplitude to said pulses generated by said tungsten bulb to produce conditioned pulses, and means generating a trip signal comprising a capacitor, means applying said conditioned pulses to said capacitor to apply charge to said capacitor, adjusting means connected to said capacitor for adjusting charge on said capacitor at a selected rate in an opposite sense from said charge applied by said conditioned pulses, and output means generating said trip signal when voltage on said capacitor reaches a predetermined value, said capacitor and adjusting means being selected such that said voltage on said capacitor represents said time attenuated accumulation; and means opening said separable contacts in response to said trip signal.

4. The circuit breaker of claim 3 wherein said trip means further includes ground fault trip means responsive to ground faults in said electrical system, and wherein said means opening said separable contacts is also responsive to said ground fault trip signal.

5. Apparatus for detecting arc faults generating step increases in current each time an arc is struck in an electrical system which is also subject to other current pulses of at least a certain high amplitude, said apparatus comprising: pulse generating means generating a pulse signal containing pulses related in amplitude to said step increases in current each time an arc is struck and containing pulses related in amplitude to said other current pulses, zener diode means limiting amplitude of said pulses in said pulse signal to a selected amplitude which is less than the amplitude of said pulses related in amplitude to said other current pulses to produce conditioned pulses, and means generating an arc fault signal as a function of a time attenuated accumulation of said conditioned pulses.

6. The apparatus of claim 5 wherein said pulse generating means includes means generating said pulse signal with pulses of a single polarity, said zener diode means comprises a single zener diode polarized to limit said amplitude of said pulses of said single polarity, and said means generating said arc fault signal comprises a capacitor, means applying said conditioned pulses to said capacitor to apply charge to said capacitor, adjusting means connected to said capacitor for adjusting charge on said capacitor at a selected rate in an opposite sense from said charge applied by said conditioned pulses, and output means generating said arc fault signal when voltage on said capacitor reaches a predetermined value, said capacitor and adjusting means being selected such that said voltage on said capacitor represents said time attenuated accumulation.

7. The apparatus of claim 6 wherein said adjusting means comprises a resistor connected in parallel with said capacitor.

* * * * *